(12) United States Patent
Clarke

(10) Patent No.: US 7,730,359 B2
(45) Date of Patent: Jun. 1, 2010

(54) REPAIR OF NETWORK COMMUNICATION FILES

(75) Inventor: Stuart Clarke, Lithonia, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 555 days.

(21) Appl. No.: 11/232,643

(22) Filed: Sep. 22, 2005

(65) Prior Publication Data

US 2007/0073735 A1    Mar. 29, 2007

(51) Int. Cl.
*G06F 11/00* (2006.01)

(52) U.S. Cl. .............................. 714/43; 714/4; 709/221

(58) Field of Classification Search ...................... 714/4, 714/43, 27; 709/220, 224, 225; 707/204, 707/100; 717/168
See application file for complete search history.

(56) References Cited

U.S. PATENT DOCUMENTS

| | | | | |
|---|---|---|---|---|
| 6,367,072 B1 * | 4/2002 | Justice et al. | ............... | 717/168 |
| 6,631,409 B1 * | 10/2003 | Watson et al. | ............... | 709/224 |
| 6,718,489 B1 * | 4/2004 | Lee et al. | ...................... | 714/43 |
| 6,883,118 B2 * | 4/2005 | Morgan et al. | ................ | 714/43 |
| 7,159,151 B2 * | 1/2007 | Morgan et al. | ................ | 714/43 |
| 7,181,653 B2 * | 2/2007 | Challener et al. | ............. | 714/39 |
| 7,346,808 B2 * | 3/2008 | Srinivasan et al. | ............ | 714/27 |
| 2003/0217126 A1 * | 11/2003 | Polcha et al. | ............... | 709/220 |
| 2004/0107199 A1 * | 6/2004 | Dalrymple et al. | .......... | 707/100 |
| 2006/0026283 A1 * | 2/2006 | Trueba | ........................ | 709/225 |
| 2006/0092861 A1 * | 5/2006 | Corday et al. | ............... | 370/256 |
| 2007/0081633 A1 * | 4/2007 | Rives et al. | ............. | 379/29.08 |
| 2007/0111568 A1 * | 5/2007 | Ferrari et al. | ................ | 439/131 |
| 2009/0307338 A1 * | 12/2009 | Arberg et al. | ............... | 709/221 |

* cited by examiner

*Primary Examiner*—Scott T Baderman
*Assistant Examiner*—Kamini Patel
(74) *Attorney, Agent, or Firm*—Hope Baldauff Hartman LLC

(57) ABSTRACT

Embodiments of the present disclosure provide method and devices for repairing computer files that impair network communications. In this regard, one embodiment of such a method, among others, can be broadly summarized by the following steps: extracting information corresponding to settings for network communications from a local resource file, wherein the local resource file is embedded within an application executed by a computer for repairing the files impairing network communication on the computer; and replacing information within a registry of the computer with at least a portion of the extracted information, wherein the replaced information includes settings pertaining to facilitation of network communications on the computer. Other methods and devices are also provided.

18 Claims, 6 Drawing Sheets

REPAIR OF NETWORK COMMUNICATION FILES

TECHNICAL FIELD

The present disclosure is generally related to computer operating systems and, more particularly, is related to configuring computer operating systems to enable network communications.

BACKGROUND

Current versions of the Microsoft Windows® operating systems (starting with Windows 95®) utilize a centralized hierarchical database to store system settings, hardware configurations, and user preferences. This database is called the Windows Registry or more commonly known as the registry.

For example, the registry stores configuration information for hardware or software that is installed within the Windows® operating system, which allows the Window® operating system to retrieve the information at later dates, such as at start up. At start up, the Windows® operating system reads the configuration information in the registry to determine which drivers need to be loaded, which settings to be applied, and which resources need to be allocated.

In addition to operating system settings, the registry also stores user preferences and application settings. For example, when a user changes his or her desktop background, these details are stored in the registry. Application settings such as what directory to which a user prefers to download files may be stored in the registry as well. Thus, the registry contains information that the operating system continually references during operation of a computer.

Viruses, spyware, and other malware can cause corruption and damage to the registry. For example, one common problem involves the Windows® Socket, also know as Winsock. A Winsock is an application programming interface (API) which communicates with other machines via the TCP/IP protocol. Winsock settings maintained in the Windows® registry are often corrupted by the installation of other programs within the Windows® operating system. After Winsock settings in the registry are corrupted, applications that need the Winsock API to operate, such as web browsers, fail to function properly. Further, measures by users to reconfigure Winsock settings in the registry often lead to additional problems and malfunctions. Thus, a heretofore unaddressed need exists in the industry to address the aforementioned deficiencies and inadequacies.

SUMMARY

Embodiments of the present disclosure provide methods and devices for repairing computer files that impair network communications. In this regard, one embodiment of such a method, among others, can be broadly summarized by the following steps: extracting information corresponding to settings for network communications from a local resource file, wherein the local resource file is embedded within an application executed by a computer for repairing the files impairing network communication on the computer; and replacing information within a registry of the computer with at least a portion of the extracted information, wherein the replaced information includes settings pertaining to facilitation of network communications on the computer.

Embodiments also include a computer readable medium having a computer program for performing the above steps. Other methods, features, devices, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
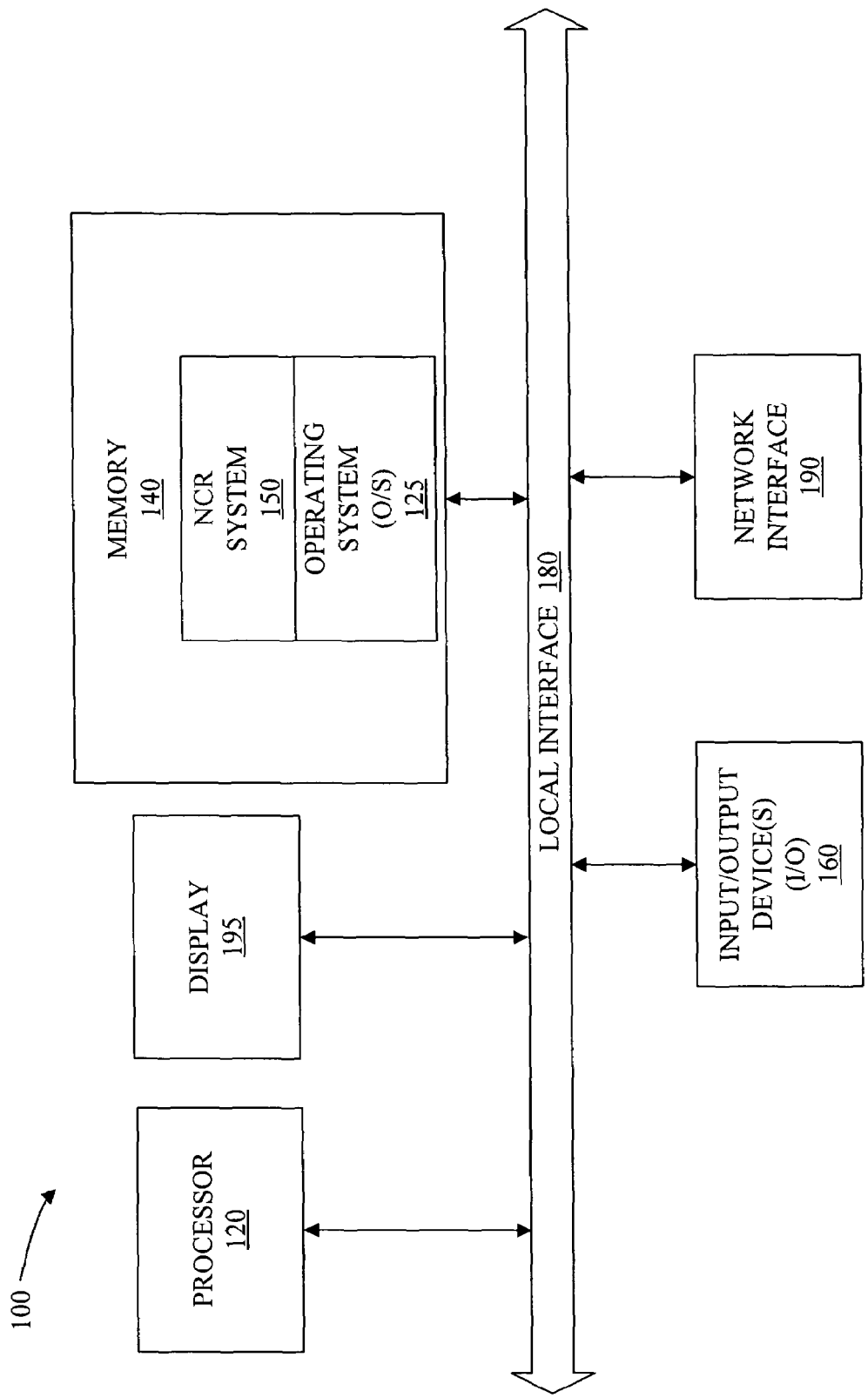
FIG. 1 is a block diagram showing a computer system having a network communication repair system in accordance with an embodiment of the present disclosure.

FIG. 1 is a block diagram showing a computer system in accordance with an embodiment of the present disclosure. General-purpose computer 100 includes a processor 120, which controls operation of various components of the computer 100.

The processor 120 is a hardware device for executing software, particularly that stored in memory 140. The processor 120 can be any custom made or commercially available processor, a central processing unit (CPU), an auxiliary processor among several processors associated with the computer 100, a semiconductor based microprocessor (in the form of a microchip or chip set), a macroprocessor, or generally any device for executing software instructions.

The memory 140 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 140 may incorporate electronic, magnetic, optical, and/or other types of storage media. Note that the memory 140 can have a distributed architecture, where various components are situated remote from one another, but can be accessed by the processor 120.

The software in memory 140 may include one or more separate programs, each of which comprises an ordered listing of executable instructions for implementing logical functions. In the example of FIG. 1, the software in the memory 140 includes a network communication repair (NCR) system 150 in accordance with an embodiment of the present disclosure and a suitable operating system (O/S) 125. The NCR system 150 is a source program, executable program (object code), script, or any other entity comprising a set of instructions to be performed. The software in the memory 140 may further include a basic input output system (BIOS) (omitted for simplicity). The BIOS is a set of essential software routines that initialize and test hardware at startup, start the O/S 125, and support the transfer of data among the hardware devices. The BIOS is stored in ROM so that the BIOS can be executed when the computer 100 is activated. Thus, it will be appreciated that a variety of software may be installed into the computer system, examples of which may include a web browser (not shown), file sharing applications (not shown), media players (not shown), etc.

A nonexhaustive list of examples of suitable commercially available operating systems 125 is as follows: (a) a Windows® operating system available from Microsoft Corporation; (b) a Netware® operating system available from Novell, Inc.; (c) a Macintosh® operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal data assistants (PDAs) (e.g., PalmOS® available from Palm Computing, Inc., and Windows CE® available from Microsoft Corporation). The operating system 125 controls the execution of other computer programs, such as the NCR system 150, and provides scheduling, input-output control, file and data management, memory management, and communication control and related services.

Processor 120, memory 140, and one or more input and/or output (I/O) devices 160 (or peripherals) are communicatively coupled via a local interface 180. The local interface 180 can be, for example but not limited to, one or more buses or other wired or wireless connections, as is known in the art.

The I/O devices 160 may include input devices, for example but not limited to, a keyboard, mouse, scanner, microphone, etc. Furthermore, the I/O devices 160 may also include output devices, for example but not limited to, a printer, display, etc. Finally, the I/O devices 160 may further include devices that communicate both inputs and outputs, for instance but not limited to, a modulator/demodulator (modem; for accessing another device, system, or network), a radio frequency (RF) or other transceiver, a telephonic interface, a bridge, a router, etc. For example, reference numeral 190 represents a network interface for communicating various information with a communication network (not shown), such as, but not limited to, the Internet. Further, reference numeral 195 denotes a monitor display which visually displays various information to the user.

Figure 2:
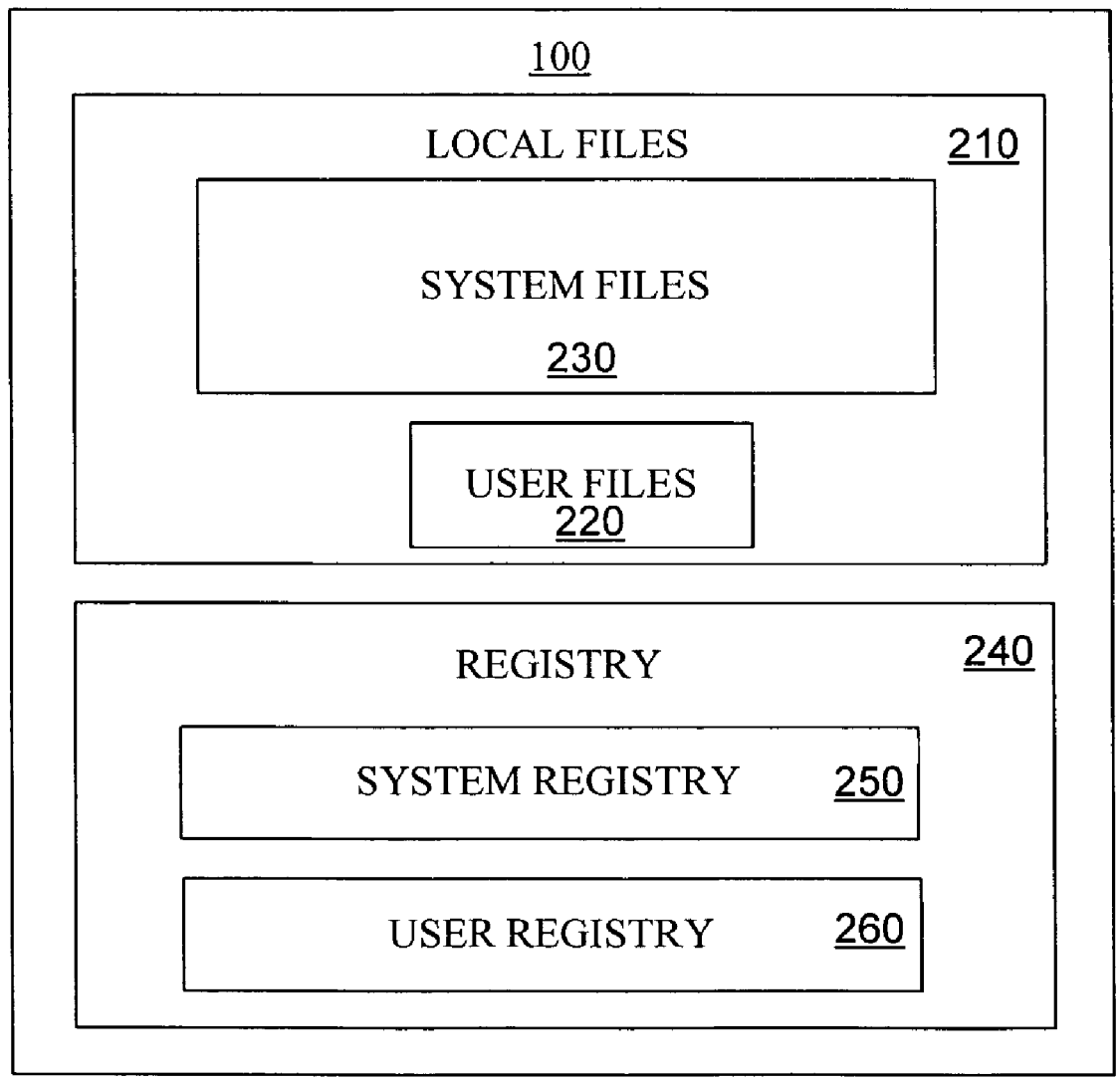
FIG. 2 is a block diagram depicting an example of one embodiment of a storage system for important information within the general-purpose computer of FIG. 1.

With reference now to FIG. 2, a block diagram depicts an example of the storage of important information within the general-purpose computer 100 that may be implemented in one embodiment of the present disclosure. General-purpose computer 100 contains local files 210, which include such files as application files, data files, device drivers, operating system files, or other types of files. Local files 210 may also include specific categories of files such as user files 220 and system files 230. User files 220 may be those application and data files that customize or configure general-purpose computer 100 in a personal manner for a specific user. System files 230 may include operating system and application files available for use to any user of the general-purpose computer 100.

General-purpose computer 100 also contains a computer registry 240. The registry 240 is a central hierarchical database in computer operating systems, such as Windows 9X and Windows NT® operating systems, where Windows 9X refers to Windows 95®, Windows 98®, and succeeding operating systems. The registry 240 stores information necessary to configure a computer system for one or more users, applications, and hardware devices. The registry 240 contains information that the operating system 125 continually reference for operation, such as profiles for each user, the applications installed on the computer 100, the types of documents that each application may create, information about folders and icons, the type of hardware on the computer system 100, and the configuration of the input/output boards. Entries in registry 240 may be categorized as system-related entries and user-related entries shown as system registry 250 and user registry 260. If registry information 240 is corrupted, serious problems can result that may require reinstallation of the operating system 125.

According to an exemplary embodiment, the structure of the registry 240 is a hierarchical structure similar to a directory/file tree. The registry 240 is organized with hives, keys, subkeys, and values. Hives are the top most portions of a hierarchical data tree with each hive containing a certain category of information. For example, one hive may contain the configuration that applies to the particular user logged on, while another hive may contain information about the hardware installed in the computer 100. Some possible hives are identified below for the Windows® operating system:

HKEY_CURRENT_USER (HKCU): This Hive contains the preferences and configuration for the particular user who is currently logged in. If a different user is logged onto the same machine, then the information in this Hive changes corresponding to that particular user's configuration.

HKEY_LOCAL_MACHINE (HKLM): This Hive contains the configuration for the actual computer. The information in this Hive remains the same regardless of the user currently logged on.

HKEY_CLASSES_ROOT (HKCR): This Hive contains the information that pertains to the core user interface such as file associations and shortcuts.

HKEY_USERS (HKU): This Hive contains the user information for all the users that have ever logged onto this computer.

HKEY_CURRENT_CONFIG (HKCC): This Hive contains the information about current hardware configuration. This Hive is linked to the HKLM Hive.

HKEY_DYN_DATA (HKDD): This Hive contains information about hardware Plug and Play. This Hive is linked to the HKLM Hive.

Keys are an organizational unit in the registry 240 that can either contain values or further subkeys. Values contain the actual data that is being stored in a key or a subkey. There are quite a few different types of values that can be stored in the registry 240, but the most common ones are binary, strings, and DWORD (32-bit) values. Registry information, in some embodiments, also includes Winsock settings associated with registry values maintained in Winsock and Winsock 2 registry keys or other related keys.

Example registry keys can be seen below. These registry keys are associated with Winsock APIs utilized by the general-purpose computer 100.

HKEY_LOCAL_MACHINE\SYSTEM\CurrentControl Set\Services\Winsock

HKEY_LOCAL_MACHINE\SYSTEM\CurrentControl Set\Services\Winsock2

If these Winsock registry keys become corrupted, then applications involving Internet communications may be impaired, in some embodiments.

For example, during the installation of a DSL (digital subscriber line) service, Winsock registry keys are often corrupted. As a result, a web browser on the general-purpose computer 100 is unable to connect with a network, such as an Internet, since the web browser makes use of the Winsock API to facilitate the connection.

Currently, help desk agents (e.g., tier-3 agents) for a DSL service "verbally" instruct customers through a number of steps that include modifying the user's registry information 240 on the general-purpose computer 100 and uninstalling network protocols from the computer 100. However, if a customer fails to follow instructions carefully, it is possible to render the customer's computer 106 inoperable. Thus, in accordance with the present disclosure, embodiments are provided for automatically repairing Winsock registry keys (or other settings related to network communication operability) at the push of a button of an interface of a network communication repair application or system 150.

Figure 3:
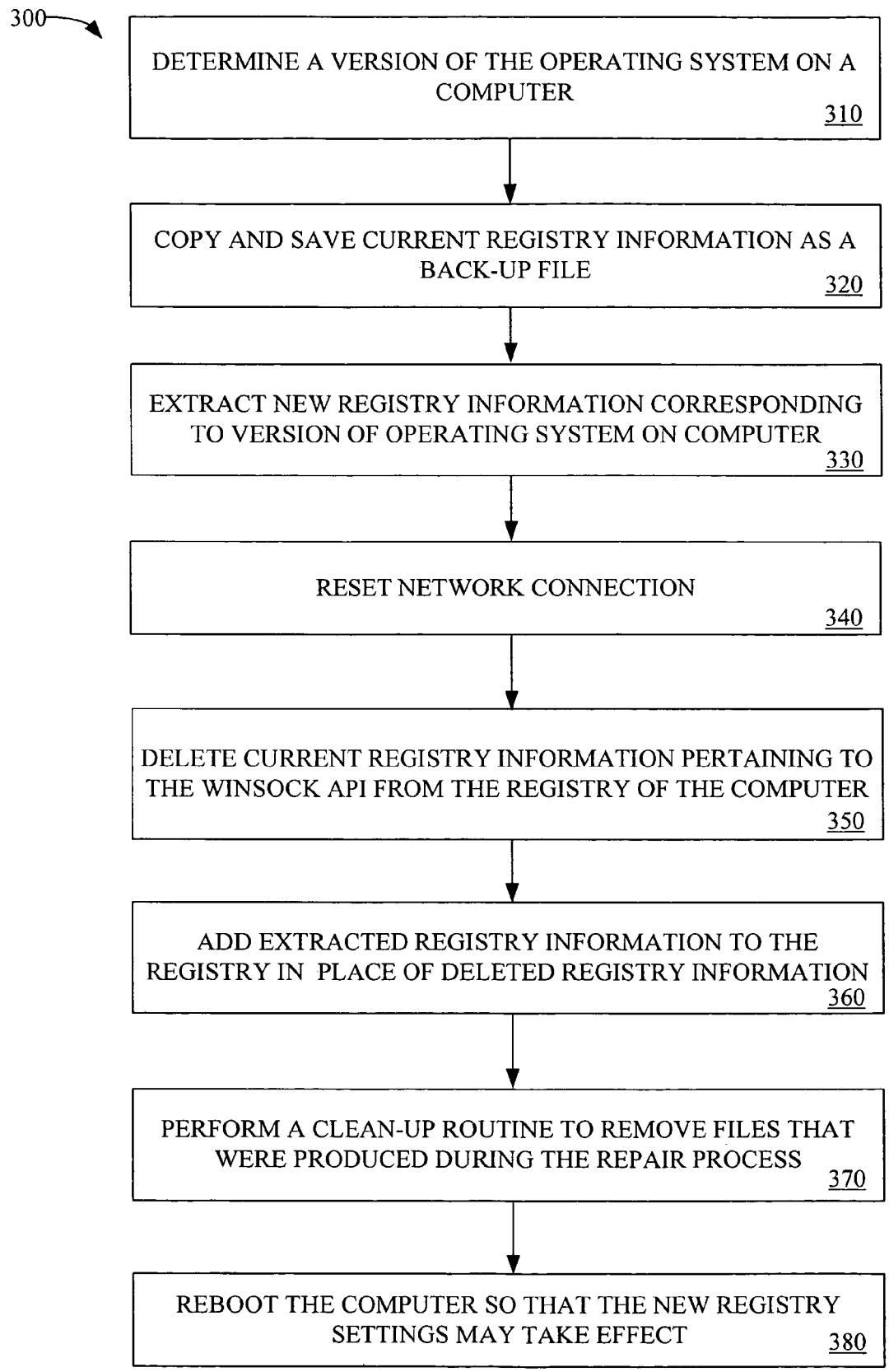
FIG. 3 is a flow chart describing one embodiment of a process for repairing corrupted entries of a registry that impair network communications in accordance with the system of FIG. 1.

With reference now to FIG. 3, a flow chart depicts one embodiment of a process 300 for repairing corrupted entries of a registry on a client computer 100 that impair network communications, such as those involving the Winsock API. The process begins by determining a version of the operating system 125 being utilized by a general-purpose computer 100 (step 310). Then, registry information within the registry is copied and saved (320) in a back-up file or files by implementing a call to the Winsock API, in one embodiment. Next, new registry information is extracted (330) from a resource file containing registry information for different versions of the operating system 125. The extracted information corresponds to the version of the operating system that was determined in step 310.

Also, as part of the process 300, the network connection for the general-purpose computer is reset (340) to release a lease for an IP address under DHCP (Dynamic Host Configuration Protocol) or to disable network communications. Subsequently, current registry information pertaining to the Winsock API are deleted (350) from the registry of the general-purpose computer, and the extracted registry information is added (360) to the registry in its place. Afterwards, a clean-up routine is performed (370) to remove any files that were produced during the repair process, such as files created to hold information extracted from the resource file. Then, the computer is rebooted (380) so that the new registry settings may take effect. Also, if need be, the back-up file(s) are maintained on the general-purpose computer so that they may be later restored to previous registry settings, if desired.

Figure 4:
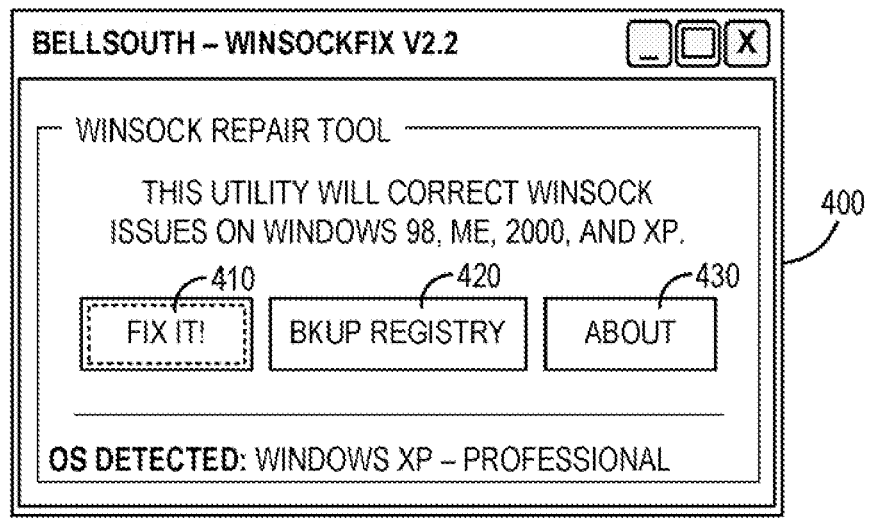
FIGS. 4-9 illustrate screenshot diagrams of a graphical user interface for one embodiment of a network communication repair system of FIG. 1.

Next, FIGS. 4-9 illustrate screenshot diagrams of a graphical user interface for one embodiment of a NCR application or system 150. In FIG. 4, a first graphical user interface (GUI) 400 is shown, where the first GUI is identified as a "Winsock Repair Tool," named "WinsockFix v2.2." As shown, the first GUI 400 includes three buttons 410, 420, 430. A first button 410 includes the label "FIX IT!" and upon activation of this button, a repair process is initiated to fix or repair registry settings that are preventing or impairing proper utilization of a Winsock API. A second button 420 includes the label "BKUP Registry" and upon activation of this button, current registry settings are copied and saved in a backup file on a general-purpose computer 100. A third button 430 includes the label "About," and upon activation of this-button, additional information is displayed regarding the NCR application 150.

Figure 5:
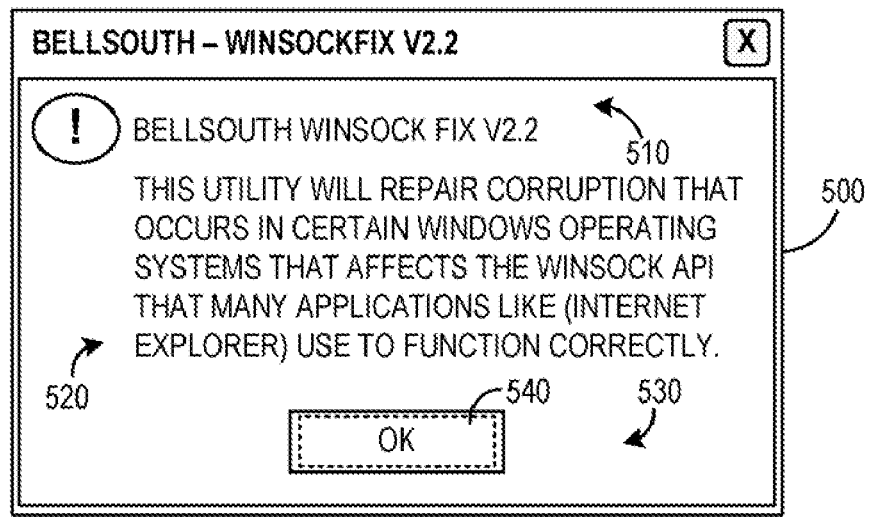

An embodiment of a second GUI 500 that displays in response to activation of the third button 430 is shown in FIG. 5. In this example, the second GUI 500 identifies a name of the application 510, a brief description of the application 520; and a copyright notice 530. Further, the second GUI 500, in one embodiment, is initially displayed adjacent to or overlaying across the first GUI 400 on the computer desktop with the second GUI receiving current desktop focus. Correspondingly, to close the second GUI 500 and return focus to the first GUI 400, a button 540 labeled "OK" may be activated from the second GUI 500.

Referring back to FIG. 4, when the first GUI 400 is displayed, the NCR application 150 determines a version of the operating system 125 that is operating on the general-purpose computer 100. As shown in the first GUI 400, a status message 440 indicates to a user the detected operating system, which may be done utilizing a Windows API, such as, but not limited to, GetVersionEx.

Figure 6:
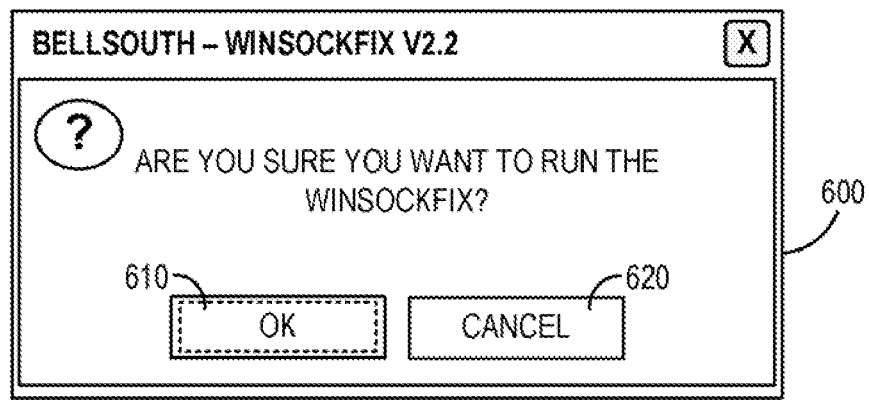
Figure 7:
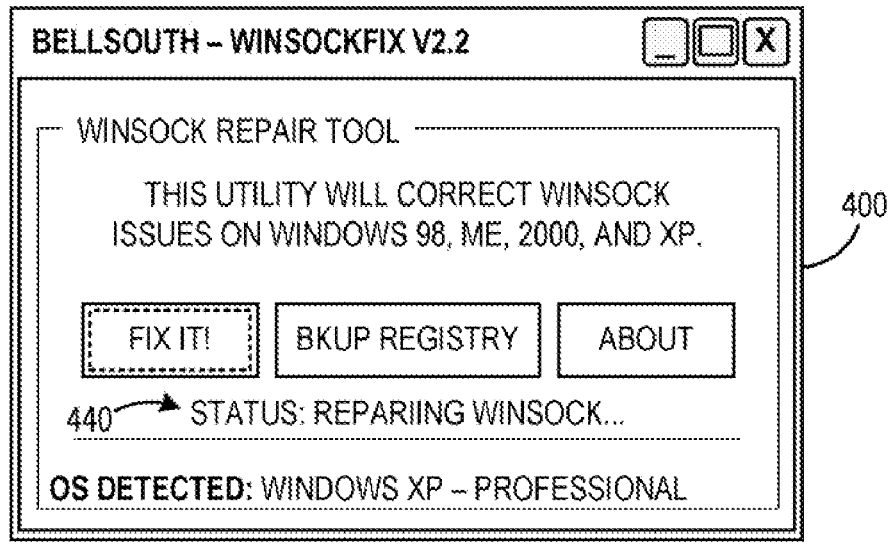

In FIG. 4, if the first button 410 is activated, then a third GUI display 600, is displayed, in one embodiment, as shown in FIG. 6. In accordance with the present disclosure, the third GUI 600 may be initially displayed adjacent to or overlaying across the first GUI 400 on the computer desktop with the third GUI initially receiving desktop focus.

With regard to FIG. 6, a user is prompted to confirm that he or she would like to continue with operation of the NCR application 150 via the third GUI 600. Accordingly, by selecting the OK button 610, a user confirms his or her desire to continue with operation of the NCR application 150 so that registry settings related to the Winsock API may be repaired. In response, the third GUI 600 is closed and removed from the desktop and focus is returned to the first GUI 400. Alternatively, if the user selects the CANCEL button 620, the interface to the NCR application 150 is closed and the operation of the application 150 is canceled.

Figure 8:
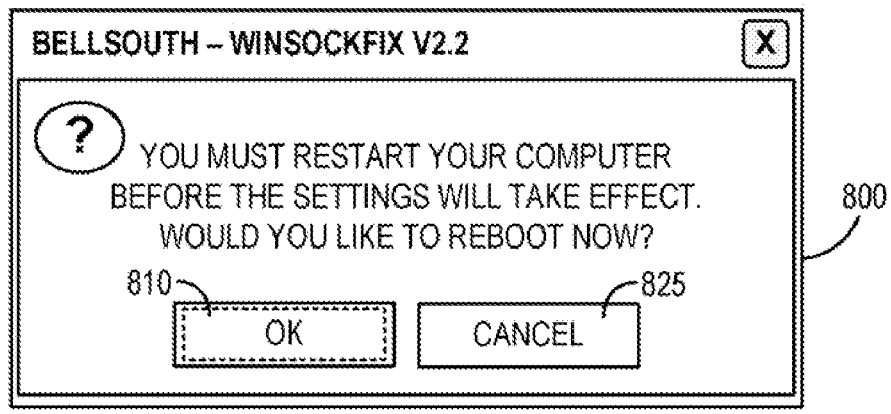

Accordingly, upon selection of the OK button 610 to confirm a desire to repair registry settings, the status message 440 on the GUI 400 is update to reflect the current step being performed by the NCR application 150. For example, in FIG. 7, the first GUI 400 displays a status message 440 stating "Repairing Winsock . . ." to indicate that the registry settings related to the Winsock API are in the process of being repaired. After the repair process is completed, then a fourth GUI 800 is displayed to prompt the user to reboot the general-purpose computer 100, so that the new settings can take effect, as shown in FIG. 8. In accordance with the present disclosure, the fourth GUI 800, in one embodiment, is initially displayed adjacent to or overlaying across the first GUI 400 on the computer desktop with the fourth GUI 800 initially receiving focus on the computer desktop.

Referring to FIG. 8, by selecting the OK button 810, the NCR application initiates a routine to restart the general-purpose computer 100 so that the new settings are recognized by the operating system 125 of the general-purpose computer 100. Alternatively, if the user selects the CANCEL button 820, then the restart routine is not initiated and focus returns to the first GUI 400 on the computer desktop.

Figure 9:
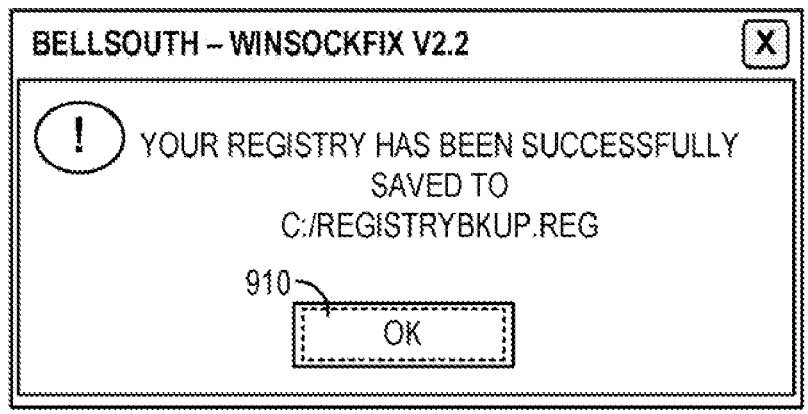

Referring back to FIG. 4, if a user selects the BKUP Registry button 420, then a fifth GUI 900 is displayed to the user, as shown in FIG. 9. The fifth GUI 900, in one embodiment, is initially displayed adjacent to or overlaying over the first GUI 400 on the computer desktop with the fifth GUI 800 initially receiving current desktop focus.

In response to selection of the BKUP Registry button 420, the NCR application 150 makes copies of registry information before operation of the NCR application is completed. Accordingly, the registry information is copied and saved in a back-up registry file that is stored locally on a hard-drive of the general-purpose computer 100. Therefore, at a later time, the information stored on the back-up file(s) may be accessed and imported back to the registry 240. Accordingly, after the BKUP Registry button 420 is selected and a back-up routine is performed, the fifth GUI 900 is displayed informing the user of completion of the back-up routine and location of files that contain saved information from the back-up routine, as shown in FIG. 9. To close the fifth GUI 900 and return focus to the first GUI 400, a button 910 labeled OK may be activated from the fifth GUI 900.

Note, in some embodiments, the registry 240 is backed up in its entirety during a back-up routine. Further, in some embodiments, the back-up routine or operation is performed, as a background process, that is transparent to the user. Also of note, in some embodiments, a NCR application 150 is configured to allow the operating system 125 to process requests from other running applications while the NCR application 150 is also operating.

In some embodiments, registry information that is replaced in the registry 240 are pre-compiled with different registry keys that are known to be valid (e.g., from documentation about the operating system 125, from experience in troubleshooting registry problems, etc.). In one embodiment, an executable file of the NCR application is embedded with a resource file that contains registry information for different versions of the operating system 125. After the NCR application 150 determines the particular version of the operating system 125 operating on the general-purpose computer 100, the NCR application 150 extracts the registry information from the embedded resource file for the particular operating system version (e.g., Windows XP). Then, the NCR application 150 resets the network connection (e.g., TCP/IP) of the general-purpose computer 100 (e.g., via utilization of Window® command-line tool, ipconfig.exe, among others).

In some embodiments, additional information besides registry information is also replaced in the general-purpose computer to repair network communication problems. For example, additional information may include, but is not limited to, host-file information.

In computing, a host file is stored on a computer's file system and is used to look up an Internet Protocol address of a device connected to a computer network. The host file describes a many-to-one mapping of device names to IP addresses. Accordingly, when accessing a device by name, the operating system 125 attempts to locate the name within the host file if it exists, before accessing the Internet domain name system (DNS). The host file can also be used in malicious ways by the authors of spyware and viruses, where a device name, such as a web site name, is associated with an IP address of another web site. Therefore, a corrupted host file may impair network communications for a general-purpose computer 100.

Figure 10:
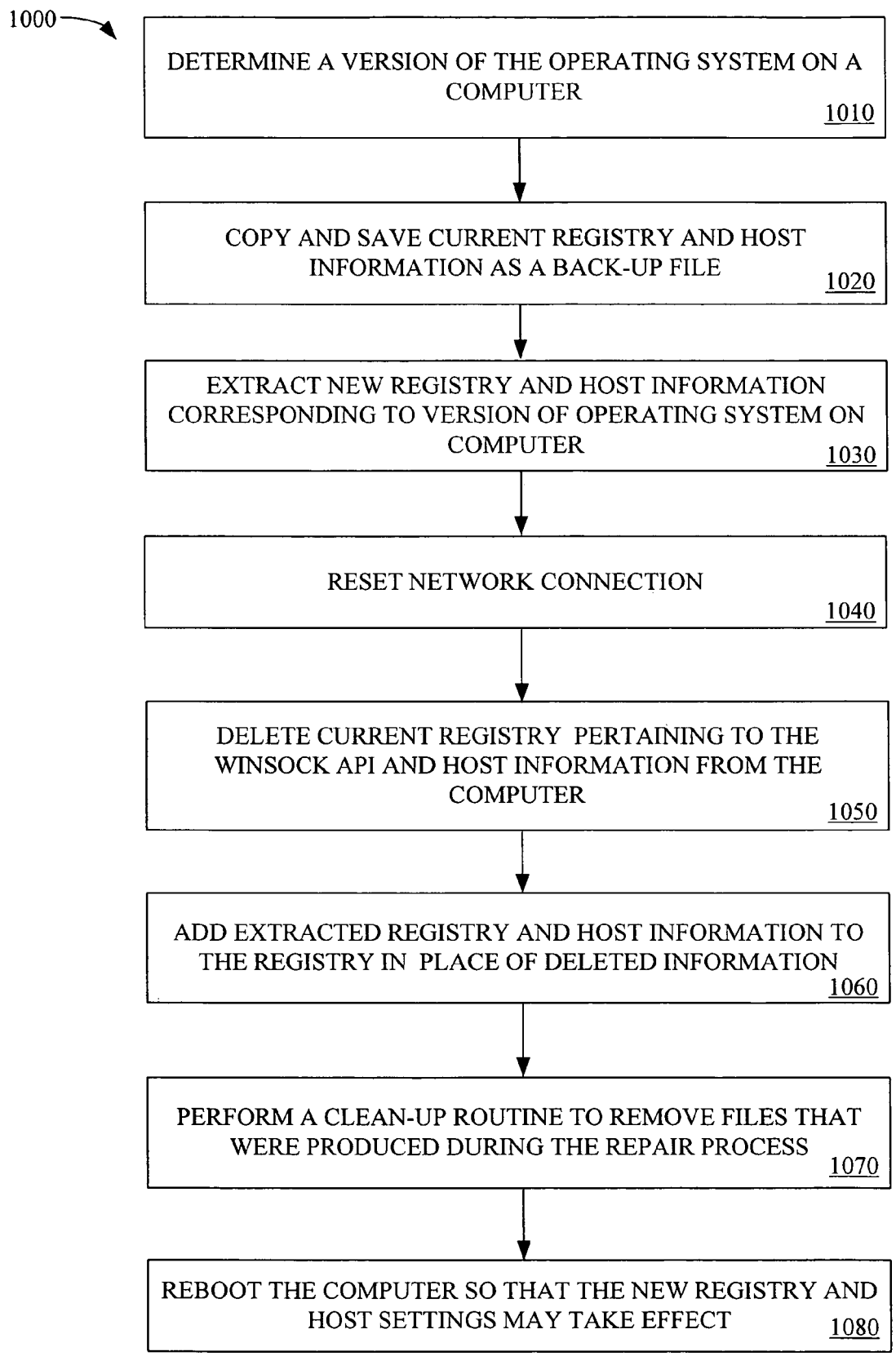
FIG. 10 is a flow chart describing one embodiment of a process for repairing registry and host information in accordance with the system of FIG. 1.

With reference now to FIG. 10, a flow chart depicts one embodiment of a process 1000 for repairing corrupt entries of a registry and host information on a general-purpose computer 100. The process begins by determining a version of the operating system 125 being utilized by a general-purpose computer 100 experiencing network communication problems, such as those involving the Winsock API (step 1010). Then, registry information within the registry and host information within the computer's file system is copied and saved (1020) in a back-up file or files. New registry and host information is extracted (1030) from a resource file containing registry information for different versions of the operating system. The extracted information corresponds to the version of the operating system that was determined in step 1010.

The process 1000 continues with the network connection for the general-purpose computer being reset (1040) (e.g., resetting TCP/IP settings, releasing lease of DCHP address, etc.). Further, current registry information pertaining to the Winsock API and host information are deleted (1050) from the general-purpose computer 100; and the extracted registry and host information are added (1060) to the registry 240 and file directory of the general-purpose computer 100 to replace the deleted information. Afterwards, a clean-up routine is performed (1070) to remove any files that were produced during the repair process, such as, files created to hold information extracted from the resource file. Then, the computer is rebooted (1080) so that the new registry and host settings may take effect. Also, if need be, the back-up file(s) are maintained on the general-purpose computer to restore 100 the previous registry and host settings, if desired.

In accordance with one embodiment, for different versions of operating systems detected by the application 150, different versions of registry information and other files associated with proper operation of the Winsock API. are extracted by the application 150, with slight variations existing between the different versions, in some embodiments. For example, for Windows XP operating system, the following keys may be replaced:

HKEY_LOCAL_MACHINE\System\CurrentControlSet\Services\Winsock

HKEY_LOCAL_MACHINE\System\CurrentControlSet\Services\Winsock2

And, for a different version, such as Windows 98 operating system, the following (and a different set of) keys may be replaced:

HKEY_LOCAL_MACHINE\System\CurrentControlSet\Services\Winsock

HKEY_LOCAL_MACHINE\System\CurrentControlSet\Services\Winsock2

HKEY_LOCAL_MACHINE\System\CurrentControlSet\Services\VXD\Dhcp

HKEY_LOCAL_MACHINE\System\CurrentControlSet\Services\VXD\Dhcoptions

HKEY_LOCAL_MACHINE\System\CurrentControlSet\Services\VXD\MSTCP

HKEY_LOCAL_MACHINE\System\CurrentControlSet\Services\VXD\Winsock2

Advantageously, embodiments of the present disclosure include new setting information for the Winsock API within an application used to repair the settings and does not rely on installation files (e.g. *.CAB files maintained on hard drives or removable installation disks) to be used to restore registry settings and other files affecting network communications. Further, embodiments of the present disclosure are not limited to the Windows® operating system. For example, other operating systems also have registry equivalents that are contemplated by the present disclosure.

There are many scenarios where different embodiments of a NCR application 150 may be utilized. For instance, in accordance with one embodiment, a new user of a DSL service may be provided a group of files necessary for installing software to implement the DSL service on a general-purpose computer 100. Accordingly, the necessary files may be stored on a removable disk that the user sets in a disk drive of the general-purpose computer 100, so that the general-purpose computer 100 may access the contents of the disk. Alternatively, the necessary files may also be downloaded from a network server onto a hard disk of the general-purpose computer 100. Accordingly, the network communication repair application 150 may be included within the group of files for implementing the DSL service as an executable file. In this way, if a user experiences problems with his or her DSL service, the user may execute the NCR application 150, so that the application 150 may resolve any Winsock issues the general-purpose computer 100 is experiencing.

Embodiments of the NCR application 150 of the present disclosure can be implemented in hardware, software, firmware, or a combination thereof. In one embodiment, the NCR application 150 is implemented in software or firmware that is stored in a memory and that is executed by a suitable instruction execution system. If implemented in hardware, as in an alternative embodiment, the NCR application 150 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In one embodiment, the NCR application 150, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, device, or transport medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the present disclosure includes embodying the functionality of the preferred embodiments of the present disclosure in logic embodied in hardware or software-configured mediums.

Any process descriptions or blocks in flow charts should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiments without departing substantially from the spirit and principles of the present disclosure. All such modifications and variations are intended to be included herein within the scope of this disclosure.

The invention claimed is:

1. A method for repairing computer files that impair network communications, comprising:

extracting information corresponding to settings for network communications from a local resource file, wherein the local resource file is embedded within an application executed by a computer for repairing the computer files impairing network communication on the computer and wherein the application for repairing the computer files impairing the network communication on the computer is included within a file for implementing a digital subscriber line service;

resetting a network connection associated with the computer; and replacing information within a registry of the computer with the extracted information, wherein the replaced information includes settings pertaining to facilitation of network communications on the computer.

2. The method of claim 1, further comprising:

determining a version of an operating system operating on the computer; and selecting the information extracted from the local resource file based upon the version of the operating system operating on the computer.

3. The method of claim 2, wherein the local resource file includes information for at least three different versions of operating systems.

4. The method of claim 1, further comprising:

prompting a user to make a back-up copy of current registry information before proceeding with replacing current registry information with extracted information.

5. The method of claim 4, further comprising:

storing the back-up copy as a file within a file directory of the computer and maintaining the file within the file directory.

6. The method of claim 5, wherein previous registry information is restored by directly importing the backup-copy of the registry information into the registry of the computer.

7. The method of claim 1, further comprising:

performing a clean-up routine to remove files that were produced to extract information from the resource file.

8. The method of claim 1, wherein the extracted information includes host information having a mapping of device names to network addresses, the method further comprising:

replacing current host information within a file directory of the computer with extracted host information.

9. The method of claim 1, wherein an interface for the application includes one button that is selectable by a user, wherein selection of the one button initiates the extracting and replacing steps.

10. A computer readable storage medium having an executable computer program for repairing computer files that impair network communications, the program having instructions for performing:

extracting information corresponding to settings for network communications from a local resource file, wherein the local resource file is embedded within an application executed by a computer for repairing the computer files impairing network communication on the computer and wherein the application for repairing the computer files impairing the network communication on the computer is included within a file for implementing a digital subscriber line service;

resetting a network connection associated with the computer; and replacing information within a registry of the computer with the extracted information, wherein the replaced information includes settings pertaining to facilitation of network communications on the computer.

11. The medium of claim 10, the program further comprising instructions for performing:
   determining a version of an operating system operating on the computer; and
   selecting the information extracted from the local resource file based upon the version of the operating system operating on the computer.

12. The medium of claim 11, wherein the local resource file includes information for at least three different versions of operating systems.

13. The medium of claim 10, the program further comprising instructions for performing:
   prompting a user to make a back-up copy of current registry information before proceeding with replacing current registry information with extracted information.

14. The medium of claim 13, the program further comprising:
   storing the back-up copy as a file within a file directory of the computer and maintaining the file within the file directory.

15. The medium of claim 14, wherein previous registry information is restored by directly importing the backup-copy of the registry information into the registry of the computer.

16. The medium of claim 10, the program further comprising instructions for performing:
   performing a clean-up routine to remove files that were produced to extract information from the resource file.

17. The medium of claim 10, wherein the extracted information includes host information having a mapping of device names to network addresses, the program further comprising instructions for performing:
   replacing current host information within a file directory of the computer with extracted host information.

18. The medium of claim 10, wherein an interface for the application includes one button that is selectable by a user, wherein selection of the one button initiates the extracting and replacing steps.

\* \* \* \* \*